United States Patent
Gronwald et al.

(10) Patent No.: US 9,105,937 B2
(45) Date of Patent: Aug. 11, 2015

(54) ELECTRODE MATERIALS FOR ELECTRICAL CELLS

(75) Inventors: Oliver Gronwald, Frankfurt (DE); Alexander Panchenko, Ludwigshafen (DE); Arnd Garsuch, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/489,101

(22) Filed: Jun. 5, 2012

(65) Prior Publication Data

US 2012/0315511 A1 Dec. 13, 2012

Related U.S. Application Data

(60) Provisional application No. 61/494,425, filed on Jun. 8, 2011.

(51) Int. Cl.

| | |
|---|---|
| H01M 10/056 | (2010.01) |
| H01M 4/60 | (2006.01) |
| H01M 10/02 | (2006.01) |
| H01B 1/04 | (2006.01) |
| C08G 75/14 | (2006.01) |
| H01M 10/05 | (2010.01) |
| H01B 1/24 | (2006.01) |
| H01M 4/38 | (2006.01) |
| H01M 4/58 | (2010.01) |
| H01M 10/052 | (2010.01) |

(Continued)

(52) U.S. Cl.
CPC .............. *H01M 10/05* (2013.01); *H01B 1/24* (2013.01); *H01M 4/382* (2013.01); *H01M 4/5815* (2013.01); *H01M 4/602* (2013.01); *H01M 10/052* (2013.01); *H01M 4/364* (2013.01); *H01M 4/587* (2013.01); *H01M 4/622* (2013.01); *H01M 4/625* (2013.01); *H01M 10/0568* (2013.01); *H01M 2220/10* (2013.01); *H01M 2220/20* (2013.01); *Y02E 60/122* (2013.01)

(58) Field of Classification Search
USPC ......................... 429/213, 231.95; 252/182.1
See application file for complete search history.

(56) References Cited

U.S. PATENT DOCUMENTS 4,416,915 A * 11/1983 Palmer et al. .............. 427/126.3
4,833,048 A    5/1989 Dejonghe et al.

(Continued)

FOREIGN PATENT DOCUMENTS

EP    0 318 430 A2    5/1989
EP    1050914 A1 *  11/2000

(Continued)

OTHER PUBLICATIONS

U.S. Appl. No. 13/479,769, filed May 24, 2012, Janssen, et al.

(Continued)

*Primary Examiner* — Ula C Ruddock
*Assistant Examiner* — Osei Amponsah
(74) *Attorney, Agent, or Firm* — Oblon, McClelland, Maier & Neustadt, L.L.P.

(57) ABSTRACT

The present invention relates to electrode materials for charged electrical cells, comprising at least one polymer comprising polysulfide bridges, and carbon in a polymorph comprising at least 60% $sp^2$-hybridized carbon atoms. The present invention further relates to electrical cells comprising the inventive electrode material, to specific polymers comprising polysulfide bridges, to processes for preparation thereof and to the use of the inventive cells.

6 Claims, 1 Drawing Sheet

(51) Int. Cl.
        *H01M 4/36*        (2006.01)
        *H01M 4/587*       (2010.01)
        *H01M 4/62*        (2006.01)
        *H01M 10/0568*     (2010.01)

(56)                References Cited

U.S. PATENT DOCUMENTS

| | | | |
|---|---|---|---|
| 5,162,175 | A | 11/1992 | Visco et al. |
| 5,595,842 | A * | 1/1997 | Nakane et al. ............ 429/223 |
| 5,723,230 | A | 3/1998 | Naoi et al. |
| 6,200,704 | B1 | 3/2001 | Katz et al. |
| 6,201,100 | B1 * | 3/2001 | Gorkovenko et al. ...... 528/388 |
| 6,210,832 | B1 | 4/2001 | Visco et al. |
| 6,576,370 | B1 * | 6/2003 | Nakagiri et al. ........ 429/231.95 |
| 2004/0157122 | A1 | 8/2004 | Naoi et al. |
| 2009/0023888 | A1 | 1/2009 | Sarukawa et al. |
| 2013/0164635 | A1 | 6/2013 | Schmidt et al. |

FOREIGN PATENT DOCUMENTS

| | | |
|---|---|---|
| JP | 5-266926 A | 10/1993 |
| JP | 2006-241542 A | 9/2006 |
| WO | WO 02/082569 A1 | 10/2002 |
| WO | WO 2007/086519 A1 | 8/2007 |
| WO | WO 2011/147924 A1 | 12/2011 |

OTHER PUBLICATIONS

U.S. Appl. No. 13/544,332, filed Jul. 9, 2012, Garsuch, et al.
International Search Report issued Oct. 25, 2012 in PCT/IB2012/052809 filed Jun. 5, 2012.
U.S. Appl. No. 13/965,509, filed Aug. 13, 2013, Panchenko, et al.
U.S. Appl. No. 13/489,713, filed Jun. 6, 2012, Garsuch, et al.
European Search Report issued Jan. 30, 2015 in Patent Application No. EP 12 79 6075 (with English Translation of Categories of Cited Documents).
Katsuhiko Naoi, et al., "A New Energy Storage Material: Organosulfur Compounds Based on Multiple Sulfur-Sulfur Bonds", Journal of the Electrochemical Society, vol. 144, No. 6, XP 55165896, (Jun. 1, 1997), pp. L170-L172.
U.S. Appl. No. 13/431,531, filed Mar. 27, 2012, Nicole Janssen, et al.
U.S. Appl. No. 13/347,058, filed Jan. 10, 2012, Arnd Garsuch, et al.
Jiulin Wang et al., "Sulfur Composite Cathode Materials for Rechargeable Lithium Batteries", Advanced Functional Materials, Jun. 2003, vol. 13, No. 6, pp. 487-492.
Peng Wang, "The Nature of the Interaction Between Polyaniline and 2,5-Dimercapto-1,3,4-thiadiazole in Electrochemical Redox Processes", Journal of the Electrochemical Society, 2002, vol. 149, No. 9, pp. A1171-A1174.
Jiulin Wang et al., "Electrochemical Characteristics of Sulfur Composite Cathode materials in Rechargeable Lithium Batteries", Journal of Power Sources, 2004, vol. 138, pp. 271-273.
Meilin Liu et al., "Novel Solid Redox Polymerization Electrodes: Electrochemical Properties", J. Electrochem. Soc., Jul. 1991, vol. 138, No. 7, pp. 1896-1901.
Andreas Jess et al., "Herstellung von Kohlenstoff-Nanotubes und -fasern durch Gasphasenabscheidung", Chemie Ingenieur Technik, 2006, vol. 78, No. 1-2, pp. 94-100.
Fritz Vögtle et al., "Notiz über ein vereinfachtes Verfahren zur Darstellung von 1,3,5-Tris(brommethyl)benzol", Chem. Ber., 1973, vol. 106, pp. 717-718.
Jiulin Wang et al., "A Novel Conductive Polymer-Sulfur Composite Cathode Material for Rechargeable Lithium Batteries", Advanced Materials, Jul. 4, 2002, vol. 14, No. 13-14, pp. 963-965.

* cited by examiner

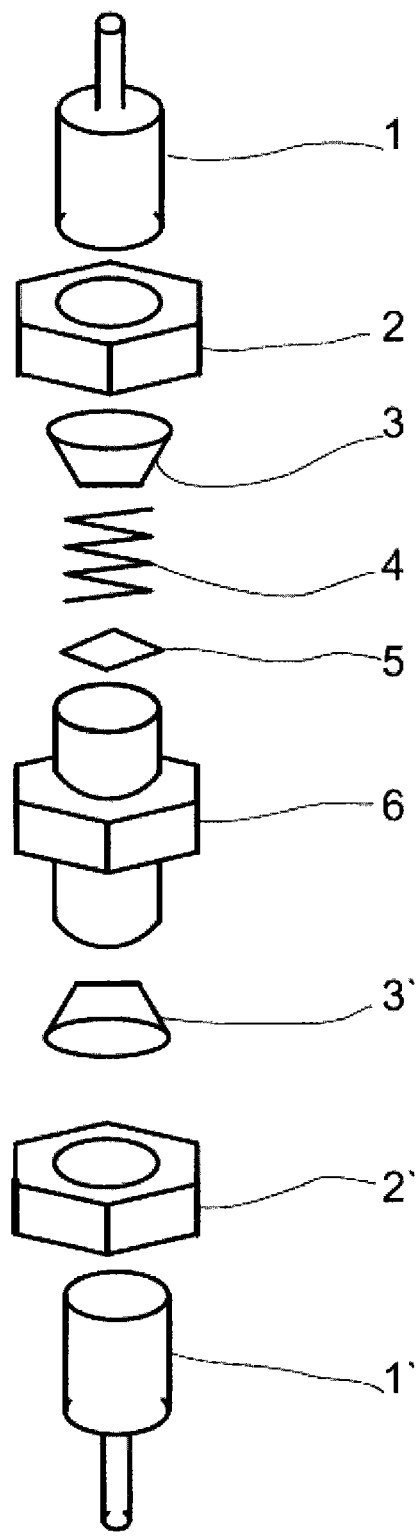

ELECTRODE MATERIALS FOR ELECTRICAL CELLS

The present invention relates to electrode materials for charged electrical cells, comprising at least one polymer comprising polysulfide bridges, and carbon in a polymorph comprising at least 60% $sp^2$-hybridized carbon atoms. The present invention further relates to electrical cells comprising the inventive electrode material, to specific polymers comprising polysulfide bridges, to processes for preparation thereof and to the use of the inventive cells.

Secondary batteries or rechargeable batteries are just some embodiments by which electrical energy can be stored after generation and used when required. Owing to the significantly better power density, there has been a departure in recent times from water-based secondary batteries to development of batteries in which the charge transport in the electrical cell is accomplished by lithium ions.

However, the energy density of conventional lithium ion batteries which have a carbon anode and a cathode based on metal oxides is limited. New horizons with regard to energy density have been opened up by lithium-sulfur cells. In lithium-sulfur cells, sulfur in the sulfur cathode is reduced via polysulfide ions to $S^{2-}$, which is reoxidized when the cell is charged to form sulfur-sulfur bonds.

A problem, however, is the solubility of the polysulfides, for example $Li_2S_4$ and $Li_2S_6$, which are soluble in the solvent and can migrate to the anode. The consequences may include: loss of capacitance and deposition of electrically insulating material on the sulfur particles of the electrode. The migration of the polysulfide ions from the cathode to anode can ultimately lead to discharge of the affected cell and to cell death in the battery. This unwanted migration of polysulfide ions is also referred to as "shuttling", a term which is also used in the context of the present invention.

There are numerous attempts to suppress this shuttling. For example, J. Wang et al. propose adding a reaction product of sulfur and polyacrylonitrile to the cathode; Adv. Funct. Mater. 2003, 13, 487 ff. This forms a product which arises by elimination of hydrogen from polyacrylonitrile with simultaneous formation of hydrogen sulfide.

It has additionally been proposed to use sulfides instead of sulfur, for example CuS, $FeS_2$ or 2,5-dimercapto-1,3,4-thiadiazole. However, the capacity of such cells was unsatisfactory; see, for example, P. Wang, J. Electrochem. Soc. 2002, A1171-1174, 149 and J. Wang et al., J. Power Sources 2004, 138, 271.

The replacement of pure sulfur by polymers comprising disulfide bridges has likewise been proposed. For instance, Liu describes the use of polyorganodisulfides as materials for solid redox polymerization electrodes (M. Liu et. al, J. Electrochem. Soc., 1991, 138, 1896-1901, U.S. Pat. No. 5,162, 175). The electrode is used in rechargeable cells together with polymeric electrolytes. However, high temperatures of 80 to 130° C. are required for the operation of the cell, and the specific capacities achieved are very low.

It was thus an object of the present invention to provide a cathode material which is easy to produce and which avoids the disadvantages known from the prior art. It was a further object of the present invention to provide novel constituents for such cathode materials and processes for preparation thereof.

This object is achieved by electrode materials for charged electrical cells, comprising
(A) polymer comprising polysulfide bridges and comprising di- or trivalent repeat units of the formula (I)

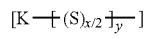

(I)

in which
K is a di- or trivalent organic radical which has 1 to 20 carbon atoms and may comprise further functional groups and/or one or more heteroatoms selected from the group of the elements consisting of O, S, N, P, Si and F,
y is 2 or 3,
x may be the same or different and is an integer from 3 to 12, and at least one of the K radicals is bonded via y $(S)_x$ bridges to y further K radicals,
(B) carbon in a polymorph comprising at least 60% $sp^2$-hybridized carbon atoms, and
(C) optionally at least one further polymer as a binder.

The polymer (A) comprising polysulfide bridges and comprising in the inventive electrode material comprises di- or trivalent, preferably trivalent, repeat units of the formula (I)

(I)

in which
K is a di- or trivalent, preferably trivalent, organic radical which has 1 to 20 carbon atoms and may comprise further functional groups and/or one or more heteroatoms selected from the group of the elements consisting of O, S, N, P, Si and F, preferably O, S and N, especially N,
y is 2 or 3, preferably 3,
x may be the same or different and is an integer from 3 to 12, preferably from 3 to 6, especially 4, and
at least one of the K radicals is bonded via y $(S)_x$ bridges to y further K radicals.

Polymers (A) comprising polysulfide bridges, in which K is a divalent organic radical, have been produced industrially since 1929 as rubber-like materials. Polyethylene tetrasulfide is effectively the prototype of these materials, which are referred to as thioplastics and find use, for example, as seal materials in the construction industry.

The di- or trivalent organic K radical derives in principle from any organic compound having 1 to 20 carbon atoms, in which two or three monovalent radicals or substituents, for example hydrogen atoms, have been theoretically abstracted so as to give a K radical with two or three unsatisfied radical atoms, especially carbon atoms. The unsatisfied two or three atoms of the organic K radical are the connection sites for the sulfur bridges.

The organic compounds from which the di- or trivalent organic K radical derives are, for example, $C_1$-$C_{20}$ alkanes, saturated $C_3$-$C_{20}$ heterocycles, $C_6$-$C_{20}$ aromatics or $C_2$-$C_{20}$ heteroaromatics, where the organic compound may also comprise double and triple bonds and further heteroatoms selected from the group of the elements consisting of F, Cl, Br, I, N, P, Si, O and S and/or may be substituted by functional groups.

Examples of possible di- or trivalent organic K radicals are:

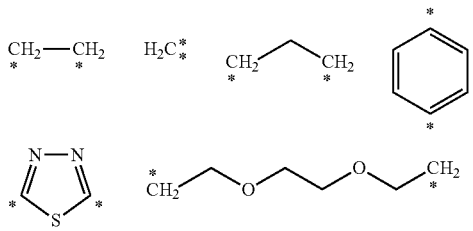

-continued

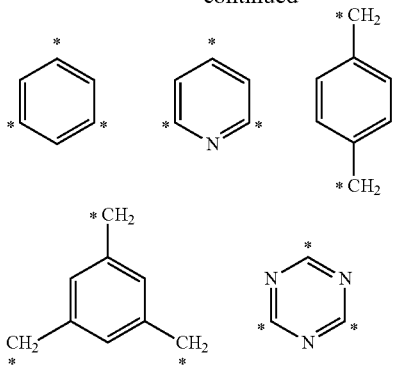

especially

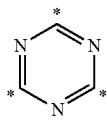

in which the $(S)_x$ bridges are connected to the atoms indicated by *.

More preferably, K in the polymer (A) comprising polysulfide bridges is a radical of the formula (II)

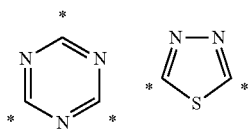
(II)

in which the $(S)_x$ bridges are connected to the carbon atoms indicated by *.

Very particular preference is given to a polymer (A) comprising polysulfide bridges, in which the repeat unit of the formula (I) is characterized by a repeat unit of the formula (Ib).

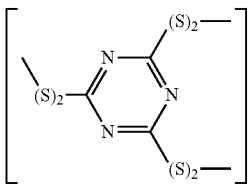
(Ib)

The inventive electrode material for a charged electrical cell further comprises carbon in a polymorph comprising at least 60% sp$^2$-hybridized carbon atoms, preferably from 75% to 100% sp$^2$-hybridized carbon atoms. In the context of the present invention, this carbon is also called carbon (B) for short, and is known as such. The carbon (B) is an electrically conductive polymorph of carbon. Carbon (B) can be selected, for example, from graphite, carbon black, carbon nanotubes, graphene or mixtures of at least two of the aforementioned substances.

Figures in % are based on all of the carbon (B) present in the electrode material together with polymer comprising polysulfide bridges (A), including any impurities, and denote percent by weight.

In one embodiment of the present invention, carbon (B) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, carbon (B) is partially oxidized carbon black.

In one embodiment of the present invention, carbon (B) comprises carbon nanotubes. Carbon nanotubes (CNTs for short), for example single-wall carbon nanotubes (SW CNTs) and preferably multiwall carbon nanotubes (MW CNTs), are known per se. A process for preparation thereof and some properties are described, for example, by A. Jess et al. in Chemie Ingenieur Technik 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon compounds in a light arc, specifically in the presence or absence of a decomposition catalyst.

In one embodiment, the decomposition of volatile carbon compound(s) is performed in the presence of a decomposition catalyst, for example Fe, Co or preferably Ni.

In the context of the present invention, graphene is understood to mean almost ideally or ideally two-dimensional hexagonal carbon crystals of analogous structure to single graphite layers.

In a preferred embodiment of the present invention, carbon (B) is selected from graphite, graphene, activated carbon and especially carbon black.

Carbon (B) may, for example, be in the form of particles having a diameter in the range from 0.1 to 100 μm, preferably 2 to 20 μm. The particle diameter is understood to mean the mean diameter of the secondary particles, determined as the volume average.

In one embodiment of the present invention, carbon (B) and especially carbon black has a BET surface area in the range from 20 to 1500 m$^2$/g, measured to ISO 9277.

In one embodiment of the present invention, at least two, for example two or three, different kinds of carbon (B) are mixed. Different kinds of carbon (B) may differ, for example, with regard to particle diameter or BET surface area or extent of contamination.

In one embodiment of the present invention, the carbon (B) selected is a combination of two different carbon blacks.

In one embodiment of the present invention, inventive electrode material comprises in the range from 20 to 80% by weight, preferably 30 to 70% by weight, of sulfur, determined by elemental analysis.

In one embodiment of the present invention, inventive electrode material comprises in the range from 0.1 to 40% by weight of carbon (B), preferably 1 to 30% by weight. This carbon can likewise be determined by elemental analysis, for example, in which case the evaluation of the elemental analysis has to take into account the fact that carbon also arrives in inventive electrode material via polymer (A), and possibly further sources.

In addition, the inventive electrode material for a charged electrical cell optionally comprises, as well as the polymer comprising sulfide bridges (A) and the carbon (B), at least one further polymer as a binder, which is also referred to in the context of the present invention as binder (C) for short. Binder (C) serves principally for mechanical stabilization of inventive electrode material.

In one embodiment of the present invention, binder (C) is selected from organic (co)polymers. Examples of suitable organic (co)polymers may be halogenated or halogen-free. Examples are polyethylene oxide (PEO), cellulose, carboxymethylcellulose, polyvinyl alcohol, polyethylene, polypropylene, polytetrafluoroethylene, polyacrylonitrile-methyl methacrylate copolymers, styrene-butadiene copolymers, tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers, ethylene-chlorofluoroethylene copolymers, ethylene-acrylic acid copolymers, optionally at least partially neutralized with alkali metal salt or ammonia, ethylene-methacrylic acid copolymers, optionally at least partially neutralized with alkali metal salt or ammonia, ethylene-(meth)acrylic ester copolymers, polyimides and polyisobutene.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

The mean molecular weight $M_w$ of binder (C) may be selected within wide limits, suitable examples being 20 000 g/mol to 1 000 000 g/mol.

In one embodiment of the present invention, the inventive electrode material comprises in the range from 0.1 to 10% by weight of binder, preferably 1 to 8% by weight and more preferably 3 to 6% by weight, based on the total mass of components (A), (B) and (C).

Binder (C) can be incorporated into inventive electrode material by various processes. For example, it is possible to dissolve soluble binders (C) such as polyvinyl alcohol in a suitable solvent or solvent mixture, water/isopropanol for example being suitable for polyvinyl alcohol, and to prepare a suspension with the further constituents of the electrode material. After application to a suitable substrate, the solvent or solvent mixture is removed, for example evaporated, to obtain an electrode composed of the inventive electrode material. A suitable solvent for polyvinylidene fluoride is NMP.

If it is desired to use sparingly soluble polymers as the binder (C), for example polytetrafluoroethylene or tetrafluoroethylene-hexafluoropropylene copolymers, a suspension of particles of the binder (C) in question and of the further constituents of the electrode material is prepared, and pressed together while being heated.

In one embodiment of the present invention, inventive electrode material comprises tungsten carbide as a further component (D). Preferably, the tungsten carbide is present as a fine powder which preferably has a particle size less than 50 µm, especially less than 20 µm.

Inventive electrode materials are particularly suitable as or for production of electrodes, especially for production of electrodes of lithium-containing batteries. The present invention provides for the use of inventive electrode materials as or for production of electrodes for electrical cells. The present invention further provides electrical cells comprising at least one electrode which has been produced from or using at least one inventive electrode material.

In one embodiment of the present invention, the electrode in question is the cathode. In the context of the present invention, the electrode referred to as the cathode is that which has reducing action on discharge (operation).

In one embodiment of the present invention, inventive electrode material is processed to give electrodes, for example in the form of continuous belts which are processed by the battery manufacturer.

Electrodes produced from inventive electrode material may, for example, have thicknesses in the range from 20 to 500 µm, preferably 40 to 200 µm. They may, for example, have a rod-shaped configuration, or be configured in the form of round, elliptical or square columns or in cuboidal form, or as flat electrodes.

In one embodiment of the present invention, inventive electrical cells comprise, as well as inventive electrode material, at least one electrode comprising metallic zinc, metallic sodium or preferably metallic lithium.

In a further embodiment of the present invention, above-described inventive electrical cells comprise, as well as inventive electrode material, a liquid electrolyte comprising a lithium-containing conductive salt.

In one embodiment of the present invention, inventive electrical cells comprise, in addition to inventive electrode material and a further electrode, especially an electrode comprising metallic lithium, at least one nonaqueous solvent which may be liquid or solid at room temperature, and is preferably liquid at room temperature, and which is preferably selected from polymers, cyclic and noncyclic ethers, cyclic and noncyclic acetals, cyclic and noncyclic organic carbonates and ionic liquids.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (X) and (XI)

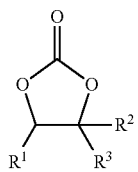

(X)

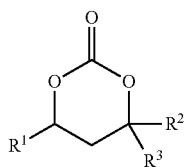

(XI)

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (XII).

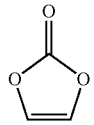

(XII)

The solvent(s) is (are) preferably used in what is known as the anhydrous state, i.e. with a water content in the range from 1 ppm to 0.1% by weight, determinable, for example, by Karl Fischer titration.

In one embodiment of the present invention, inventive electrochemical cells comprise one or more conductive salts, preference being given to lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:

m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium and toward lithium sulfides and lithium polysulfides. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, the separators selected may be separators made from PET nonwovens filled with inorganic particles. Such separators may have a porosity in the range from 40 to 55%. Suitable pore diameters are, for example, in the range from 80 to 750 nm.

Inventive electrical cells are notable for particularly high capacities, high performance even after repeated charging, and significantly delayed cell death. Shuttling can very readily be suppressed. Inventive electrical cells are very suitable for use in automobiles, aircraft, ships or stationary energy stores. Such uses form a further part of the subject matter of the present invention.

The present invention further provides a polymer comprising polysulfide bridges and comprising trivalent repeat units of the formula (Ia)

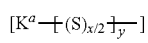

(Ia)

in which
$K^a$ is a trivalent organic radical which has 1 to 20 carbon atoms and may comprise further functional groups and/or one or more heteroatoms selected from the group of the elements consisting of O, S, N, P, Si and F, preferably O, S and N, especially N,
y is 3,
x may be the same or different and is an integer from 3 to 12, preferably from 3 to 6, especially 4, and at least one of the $K^a$ radicals is bonded via y $(S)_x$ bridges to y further $K^a$ radicals.

The trivalent organic $K^a$ radical having 1 to 20 carbon atoms can in principle be described in exactly the same way as the above-described trivalent K radical of the formula (I).

In a preferred embodiment, $K^a$ in the polymer comprising polysulfide bridges and comprising trivalent repeat units of the formula (Ia) is a radical of the formula (II)

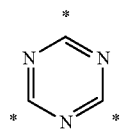

(II)

in which the $(S)_x$ bridges are connected to the carbon atoms indicated by *.

The present invention further provides a process for preparing the above-described polymer comprising polysulfide bridges, comprising at least one process step wherein a compound of the formula (III)

(III)

or the corresponding alkali metal salts of the formula (IV)

$$K^a\text{---}[SM]_y \tag{IV}$$

are reacted with a compound of the formula (V)

$$\text{Hal---}(S)_z\text{---Hal} \tag{V}$$

or a compound of the formula (VI)

$$K^a\text{---}[LG]_y \tag{VI}$$

is reacted with a compound of the formula (VII)

$$H\text{---}(S)_x\text{---}H \tag{VII}$$

or with the corresponding bis-alkali metal salt of the formula (VIII)

$$M\text{---}(S)_x\text{---}M \tag{VIII}$$

or with elemental sulfur $S_8$,
in which, in the formulae (III), (IV), (VI), (VII) and (VIII), $K^a$, x and y are each as defined above, and, in the formulae (IV), (V), (VI) and (VIII),
M is Li, Na, K, Cs or $NH_4$, preferably Li or Na, especially Na,
Hal is F, Cl, Br, I, $F_3C$ or $F_5C_2$, preferably Cl or Br, especially Cl,
LG is a leaving group, preferably $MeSO_3$, $ToISO_3$, $F_3CSO_3$, Cl or Br, especially Cl, and
z is an integer from 1 to 10, preferably 1 to 5, more preferably 1 or 2, especially 2.

Compounds of the formula (III) and the route to the alkali metal salts of the formula (IV) derived therefrom are known in principle to those skilled in the art, for example 1,2,3-trimercaptopropane, 1,1,1-tris(mercaptomethyl)hexane or 1,3,5-triazine-2,4,6-trithiol.

Compounds of the formula (V) are common knowledge to the person skilled in the art. For instance, the homologous series of the compounds $S_nCl_2$ where n is 1 to 8 and the homologous series of the compounds $S_nBr_2$ where n is 2 to 8 are known. The compounds $SCl_2$ and $S_2Cl_2$ are produced and processed industrially on the multitonne scale.

Examples of compounds of the formula (VI) are likewise known to those skilled in the art. For example, 2,4,6-trichloro-1,3,5-triazine is commercially available, and 1,3,5-tri(bromomethyl)benzene can be obtained by triple free-radical bromination of mesitylene (Chem. Ber., 106, 717).

The compounds of the formulae (VII) and (VIII) and the synthesis thereof are likewise known to those skilled in the art. The same applies to elemental sulfur.

In a preferred variant of the process according to the invention, in the at least one process step, a compound of the formula (III) which is characterized by a compound of the formula (IIIa)

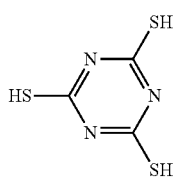

(IIIa)

is reacted with the compound of the formula (V) which is characterized by a compound of the formula (Va)

$$Cl\text{---}(S)_2\text{---}Cl \tag{Va}$$

The process according to the invention is preferably performed in a solvent, in which case the reaction product frequently precipitates out as an insoluble solid and can be removed in a simple manner by known methods.

In the case of the process according to the invention, the reaction conditions with regard to reaction temperature, pressure, starting stoichiometry and reaction time are known in principle to the person skilled in the art or can be optimized with regard to the yield without any great experimental complexity.

The inventive electrode material allows the production of electrical cells with a high specific capacity without the addition of elemental sulfur, while simultaneously suppressing what is called sulfide shuttling and achieving an increased lifetime, especially also at temperatures below 30° C.

The invention is illustrated by the examples which follow, but which do not restrict the invention.

Figures in % relate to percentage by weight, unless explicitly stated otherwise.

I. Synthesis of Polymer Comprising Polysulfide Bridges
I.1 Synthesis of Polydisulfide Cyanuric Acid (P1)

5 g of trithiocyanuric acid (also called 1,3,5-triazine-2,4,6-trithiol; M=177.27 g/mol, 28 mmol) were initially charged in 200 ml of anhydrous tetrahydrofuran and dissolved within 5 minutes. 5.7 g (M=135.04 g/mol, 42.3 mmol) of disulfur dichloride ($S_2Cl_2$) were added dropwise within 10 minutes, in the course of which a temperature rise of 5° C. was observed. The reaction was conducted for a duration of 6 h, and the hydrochloric acid which formed was driven out by means of a scrubbing tower. The precipitate was filtered off, washed with tetrahydrofuran and dried under reduced pressure.

Yield: 7.6 g of solid (P1), corresponding to 99%. The calculated theoretical specific capacity is 595 mAh/g.

| Elemental analysis | | |
|---|---|---|
| | Calculated | Found |
| Carbon | 13.33% | 14.2% |
| Sulfur | 71.13% | 70.0% |
| Nitrogen | 15.44% | 15.1% |

II. Production of Electrode Material and Electrodes
II.1 Processing of P1 to Give an Inventive Cathode K1

7.0 g of solid P1 were homogenized with 0.7 g of carbon black (commercially available as Printex XE 2 from Evonik) and 0.7 g of tungsten carbide in a mortar. Yield 8.3 g of P1-h.

In a laboratory glass bottle, 0.50 g of polyvinyl alcohol was dissolved in 80.0 g of water/isopropanol. To produce the ink, 1.62 g of carbon black (commercially available as Super P from Timcal AG, 6743 Bodio, Switzerland) and 7.69 g of Ph-1 were then added and the mixture was stirred. For dispersion, the mixture was transferred to a stainless steel milling vessel and then a ball mill (Pulverisette from Fritsch) was used, stirring with stainless steel balls at 300 rpm for 30 min. The dispersion formed a very homogeneous ink with creamy consistency. The ink was sprayed by means of an airbrush method onto aluminum foil (thickness: 20 μm) on a vacuum table (temperature: 60° C.). Nitrogen was used for spraying. A solids loading of 2.5 mg/cm² was achieved.

II.2 Production of a Comparative Cathode C-K2

In a laboratory glass bottle, 0.02 g of polyvinyl alcohol was dissolved in 16.0 g of water/isopropanol. To produce the ink, 1.25 g of carbon black (commercially available as Super P from Timcal AG, 6743 Bodio, Switzerland), 0.07 g of graphite (commercially available as KS6 from Timcal AG, 6743 Bodio, Switzerland) and 0.93 g of sulfur were then added and the mixture was stirred. For dispersion, the mixture was transferred to a stainless steel milling vessel and then a ball mill (Pulverisette from Fritsch) was used, stirring with stainless steel balls at 300 rpm for 30 min. The dispersion formed a very homogeneous ink with creamy consistency. The ink obtained was sprayed by means of an airbrush method onto aluminum foil (thickness: 20 μm) on a vacuum table (temperature: 60° C.). Nitrogen was used for spraying. A solids loading of 2.5 mg/cm² was achieved.

III. Testing of the Cathodes in Electrochemical Cells

For the electrochemical characterization of the inventive electrode material produced from inventive polymer P1 and of the cathode K1 produced therefrom and for characterization of the comparative cathode C-K2, electrochemical cells according to FIG. 1 were constructed. For this purpose, as well as the cathodes produced in II., the following components were used in each case:

Anode: Li foil, thickness 50 μm,
Separator: microporous, three-ply membrane (PP/PE/PP) (commercially available as Celgard® 2340) of thickness 38 μm
Cathode: according to example II.
Electrolyte: 1M LiTFSI (LiN(SO$_2$CF$_3$)$_2$ in 1:1 mixture with dioxolane and dimethoxyethane FIG. 1 shows the schematic structure of a dismantled electrochemical cell for testing of inventive electrode materials.

The annotations in FIG. 1 mean:
1, 1' die
2, 2' nut
3, 3' sealing ring—two in each case; the second, somewhat smaller sealing ring in each case is not shown here
4 spiral spring
5 output conductor made from nickel
6 housing The charging and discharging of the particular cell was conducted with a current of 0.22 mA at potentials in the range from 1.8 to 2.5 V. Results are compiled in table 1.

TABLE 1

Test results for inventive and noninventive electrochemical cells

| Example | Sulfur utilization 5th cycle | Sulfur utilization 50th cycle | Sulfur utilization 100th cycle |
|---|---|---|---|
| Cathode K1 based on P1 | 86% | 83% | 76% |
| Cathode V-K2 based on S$_8$ | 68% | 48% | — (battery collapses) |

The percentages for the sulfur utilization are based on a theoretically calculated value.

The invention claimed is:

1. An electrode material, comprising:
   a polymer comprising a polysulfide bridge and comprising a trivalent repeat unit, carbon in a polymorph comprising at least 60% sp²-hybridized carbon atoms, and
   optionally a further polymer as a binder,
   wherein the trivalent repeat unit is of formula (I):

(I)

K is a radical of formula (II):

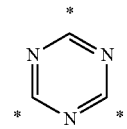
(II)

and wherein (S)$_x$ bridges are connected to carbon atoms designated by *,
y is 3,
x is 4, and
at least one K radical is bonded via y (S)$_x$ bridges to y other K radicals, and
the electrode material is suitable for a charged electrical cell,
wherein the electrode material further comprises tungsten carbide.

2. An electrical cell comprising an electrode obtained from or with the electrode material of claim 1.

3. The electrical cell according to claim 2, further comprising an electrode comprising metallic lithium.

4. The electrical cell according to claim 2, comprising a liquid electrolyte comprising a conductive lithium salt.

5. The electrical cell according to claim 2, further comprising at least one nonaqueous solvent selected from the group consisting of a polymer, a cyclic or noncyclic ether, a noncyclic or cyclic acetal, and a cyclic or noncyclic organic carbonate.

6. An automobile, aircraft, ship or stationary energy store, comprising the electrical cell of claim 2.

* * * * *